Sept. 28, 1965

R. G. McGRATH 3,209,145

FLUID FLOW RADIOACTIVITY MEASURING
APPARATUS AND SAMPLING MEANS

Filed April 24, 1961

WITNESSES
John E. Heasley Jr.
A. J. Santantonio

INVENTOR
Robert G. McGrath
BY
D. G. Smith
ATTORNEY

United States Patent Office 3,209,145
Patented Sept. 28, 1965

3,209,145
FLUID FLOW RADIOACTIVITY MEASURING
APPARATUS AND SAMPLING MEANS
Robert G. McGrath, Penn Hills, Pa., assignor to Westinghouse Electric Corporation, East Pittsburgh, Pa., a corporation of Pennsylvania
Filed Apr. 24, 1961, Ser. No. 104,925
18 Claims. (Cl. 250—43.5)

This invention relates in general to an arrangement for measuring radioactivity and more particularly to an arrangement for measuring the total amount or the rate of radioactivity being transported by a fluid flowing within a conduit or the like.

Radioactive isotopes produced by nuclear power reactors are permitted to be discharged in very small quantities to the atmosphere or to suitable drains or storage facilities. Because these isotopes are likely to find their way into plant and animal life which may be consumed by human beings, it is necessary to control the amount of radioactive isotopes which is discharged to the enviroment. In order to control the amount of radioactive material which is discharged as waste, it is necessary to determine the quantity of radioactive material in the waste, or the total radioactivity thereof, and the rate at which the material is discharged.

Heretofore, it has been the practice to determine the quantity of radioactive material being discharged by first measuring the rate of fluid flow by suitable means, second by measuring the specific activity or radiation per unit volume of the fluid with a radiation detector, and third by multiplying the results of the two previous measurements. This procedure, however, is difficult to apply where the flow rates are changing and particularly where it is desired to integrate these results to obtain the total radioactivity being discharged in a given length of time.

In view of the foregoing, it is an object of the invention to provide a novel and more efficient radiation detecting arrangement.

A further object of the invention is the provision of a radiation detecting arrangement, for use with a flowing radioactive fluid, or the like, which directly measures the rate at which radioactivity is being transported by the fluid. More specifically, it is an object to provide a measurement which is reported directly in units of radioactivity of a transported material per unit time.

A still further object of the invention is the provision of a radiation measuring arrangement, for use with flowing radioactive fluids or other materials, which integrates the specific activity of the fluid or other material and its rate of flow to obtain a direct indication of the total radioactivity being transported by the fluid or other material.

A further object of the invention is to provide a radiation detecting arrangement which operates over an extended range, and in certain applications over two or more such ranges relative to the transported material in order to assure accuracy.

Another object of the invention is to provide an arrangement for improving radiation readings at low flows of the transported material.

Still another object of the invention is to provide a means for improving the accuracy of the radiation readings at all flows of the transported material.

A still further object of the invention is to improve the response time of a radiation detecting arrangement.

Other objects and a more complete understanding of the invention may be had by referring to the following description when taken in conjunction with the accompanying drawings, in which.

The radiation detecting arrangement, described more fully hereinafter, is a unique combination of manometer means and a radiation detector, which are arranged to produce a measurement directly in terms of total radioactivity, or rate thereof, being transported by a flowing fluid or the like. To accomplish this, means are provided to monitor at least a portion of the fluid and to measure the amount of radioactivity being emitted by the fluid portion. In this embodiment, a volume of manometer fluid is displaced in an amount proportional to the flow of the fluid in the conduit. A continuous sample of the flowing fluid is then permitted to fill the volume of a reservoir from which the manometer fluid is displaced. A radiation detector, placed in the vicinity of the sample, detects the radioactivity of the fluid sample contained in the reservoir from which the manometer fluid has been displaced. Therefore, the radiation detector detects an amount of radiation which is proportional to the product of the flow rate and the specific radioactivity of the flowing fluid, as represented by the aforementioned continuous sample. The term fluid, as used herein, designates gases, liquids, or any suitable vehicle containing particulate material, such as slurries, dust in gas, or generally speaking particulate material suspended in vehicles.

Figure 1:
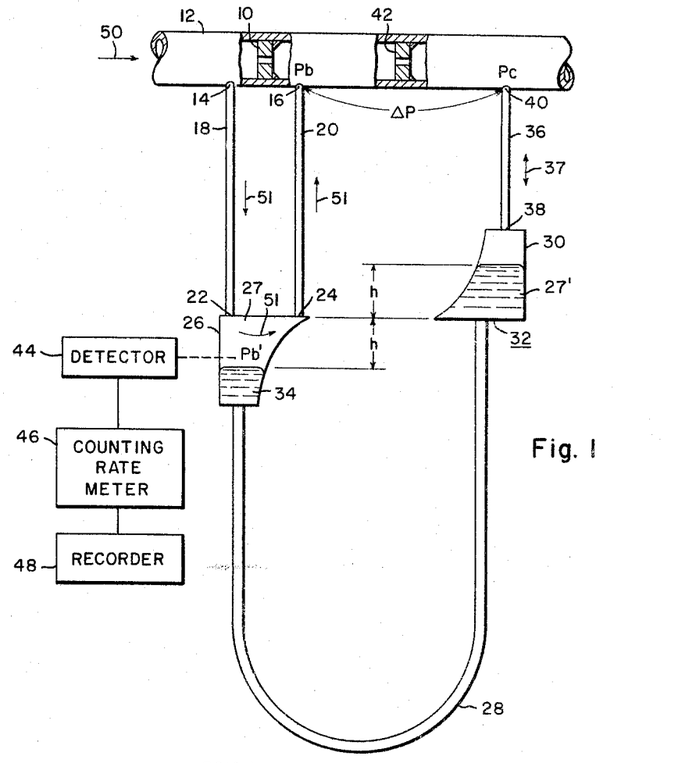
FIGURE 1 is a schematic fluid and electric circuit view, partially in section, of one form of the invention showing the components which comprise the radiation detecting arrangement.

Referring now more particularly to FIGURE 1 of the drawings, a first pressure reducing means such as an orifice 10 is installed within a main conduit 12 containing the fluid or other material to be monitored. The orifice 10 can be welded into position as shown or alternatively can be inserted between a pair of orifice flanges (not shown). Taps 14 and 16 are provided in the main conduit 12 on either side of the orifice 10. Similarly, taps 22 and 24 are provided in the top of a measuring chamber 26 and adjacent the extreme upper ends of the chamber 26. Conduit means such as the tubes 18 and 20 couple the taps 14 and 16 to the taps 22 and 24, respectively. The length of the tubes 18 and 20 desirably are as short as practical to reduce the lag time between conditions in the main conduit 12 and the chamber 26.

The diameter of the tube 20 is desirably made large in comparison to the diameter of the tube 18 to create a pressure $P_b'$ in the chamber 26 which is only slightly above the pressure $P_b$ in the main conduit 12 on the downstream side of the orifice 10 whenever a main flow, as indicated by arrow 50, occurs. The orifice 10 creates a pressure drop in the conduit 12 which diverts a portion of the main flow 50 in the conduit 12 through the measuring chamber 26 in a manner presently to be described.

A manometer means 32, including the measuring chamber 26 and a generally similar collection chamber 30, a manometer conduit for coupling the chamber 26 to the chamber 30 such as a U-tube 28, and a manometer fluid 34, for example mercury, contained within the manometer means 32, forms an integral part of the radioactivity measuring arrangement in this example of the invention. In this arrangement, the manometer means 32 is installed in a generally vertical position, and the chambers 26 and 30 are shaped to produce corresponding volume changes within the chambers 26 and 30 which have the same height $h$ and which are proportional to the square root of the height $h$ of a displaced volume 27 of the manometer fluid 34 within the chamber 26. The chambers 26 and 30 are installed at the top of U-tube 28, with one such chamber being installed at each end of the U-tube 28. The measuring chamber 26 is installed so that the widest part is at the top, and the collection chamber 30 is installed in an inverted position relative to that of the measuring chamber 26. The top of the measuring chamber 26 desirably is located in the same horizontal plane as the bottom of the collection chamber 30.

Under no flow conditions in this arrangement, the surface of the manometer fluid 34 will be level, will be at the same height in both sides of the manometer means 32, and thus will substantially fill the measuring chamber 26 without having any of the manometer fluid 34 entering the collection chamber 30. An additional conduit means, such as a tube 36, connects the collection chamber 30 to the main conduit 12 through taps 38 and 40, respectively. The tap 40 is located downstream, in this example, from a second pressure reducing means such as an orifice 42. The orifice 42 is installed in the main conduit 12 downstream of the tap 16 and in the same manner as previously described for the orifice 10.

The relative locations of the orifices 10 and 42 and the taps 14, 16 and 40 are to meet conditions normally imposed upon such installations by one skilled in such art. The material used in the construction of the above-mentioned components desirably is the same as that required for the main conduit 12 in order to maintain the integrity of the system which includes the main conduit 12, particularly in those applications wherein the system is required to be hermetically sealed.

A radiation detector 44 is located in a position where it can receive the maximum amount of radiation from the front surface, as viewed in FIG. 1, of the measuring chamber 26. The detector 44 then provides a signal to a counting rate meter 46. The counting rate meter 46, in turn, provides a signal to a recorder 48, which records and makes a permanent record of the amount of radiation detected by the detector 44. The recorder 48 can be arranged to record the total amount of radioactivity flowing through the conduit 12 or to record the rate of discharged radioactivity per given unit of time, in a well known manner.

The main fluid flow 50 flows through the main conduit 12. A sampled flow or continuous sample, as indicated by arrow 51, is a diverted portion of the main flow 50 and flows through the measuring chamber 26, and through tubes 18 and 20. The orifice 10 is installed to create a pressure drop in the main conduit 12 and, thus, to divert the sampled flow 51 through the measuring chamber 26. The pressure dropping arrangement ensures that the sampled flow 51 passing through the measuring chamber 26 is a representative sample and is proportional to the main flow 50. The orifice 42 is installed in the main conduit 12 to create a second pressure drop in the main conduit 12. The pressure drop produced by the orifice 42 is then measured by the manometer means 32, in that the total level change $2h$ of the manometer fluid 34 indicates the rate of flow in the conduit 12. Thus, the diverted sample flow 51 is proportional to $h$ and, consequently, to the aforesaid rate of flow.

The chambers 26 and 30 are so sized that the anticipated displacement of the manometer fluid 34 can be contained therein and that the displacement height $h$ in the measuring chamber 26 is equal to the increase in height $h$ of the manometer fluid in the collection chamber 30, as explained more fully hereinafter. That portion of the flowing fluid contained within the chamber 30 flows back and forth through the tube 36, as indicated by arrow 37, only when it is acted upon by the movement of the manometer fluid 34. The main flow 50 causes a pressure drop ($\Delta P$) across the orifice 42 according to Equation 1 below, which drop in turn causes displacement of the manometer fluid 34:

$$\Delta P = P_b - P_c = kF^2 \qquad (1)$$

where:

$P_b$ = pressure downstream of the orifice 10.
$P_c$ = pressure downstream of the orifice 42.
$k$ = a constant.
$F$ = the main flow 50.

The size of the tube 20 is chosen so that the pressure drop therein from the measuring chamber 26 to the main conduit 12 is small, for instance, with $P_b' \cong P_b$ and substituting in Equation 1:

$$P_b' - P_c \cong kF^2 \qquad (2)$$

where:

$P_b'$ = pressure in the measuring chamber 26.

The pressure drop $\Delta P$ across the orifice 42 will cause the manometer fluid 34 in the manometer means 32 to move a distance $h$ in each manometer leg, including the chamber 26 or 30, respectively, in accordance with Equation 3 below:

$$P_b' - P_c = k_1 h \qquad (3)$$

where:

$k_1$ = a constant which is dependent upon the density of the manometer fluid 34.

Substituting Equation 3 in Equation 2 will result in the following Equation 4:

$$k_1 h = kF^2 \qquad (4)$$

or $$F = k_2 \sqrt{h} \qquad (5)$$

where:

$$k_2 = \sqrt{k_1/k} \qquad (6)$$

In this example, the chambers 26 and 30 at each end of the manometer tube 28 are so shaped that the volume change within the chambers 26 and 30, as the manometer fluid 34 changes in level, is proportional to the square root of $h$, for instance:

$$V = k_3 \sqrt{h} \qquad (7)$$

where:

$V$ = displaced volume 27 or 27'.
$k_3$ = a constant.

Then from Equations 5 and 7

$$V = CF \qquad (8)$$

where:

$$C = k_3/k_2 \quad (9)$$

As a result, the volume occupied by the sampled flow 51 in the measuring chamber 26, which is exposed to the detector 44, is proportional to the main flow 50. Since the activity received by the detector 44 is proportional to the product of the specific activity of the sampled flow 51 and the volume of the sampled flow 51 in the chamber 26, the detector 44 will read directly a quantity proportional to the total activity of the main flow 50.

By the total activity of the main flow 50 is meant the total amount of radioactivity passing through the main conduit 12 per unit of time. Furthermore, the total activity can be described as a rate per unit of time, which can be integrated on a daily, weekly or even yearly basis. The integration means can be incorporated within the radiation detecting circuitry, for example at the recorder 48, and includes any standard means known to those skilled in the art.

When the detector 44 is located as shown in FIGURE 1, the measuring chamber 26 and the detector 44 desirably are shielded (not shown) so as to eliminate background radiation or scattered radiation. Other detector locations can also be selected, as apparent to those skilled in the art. For instance, the detector 44 can be placed inside the chamber 26; or if the detector 44 is constructed as a large ion chamber, the measuring chamber 26 can be placed inside the detector 44. The location of the detector 44 should be selected so that, for a given specific activity in the sampled flow 51, the radiation reading of the detector 44 has access to substantially all of the displaced volume 27 occupied by the sampled flow 51 in the measuring chamber 26.

Figure 2:
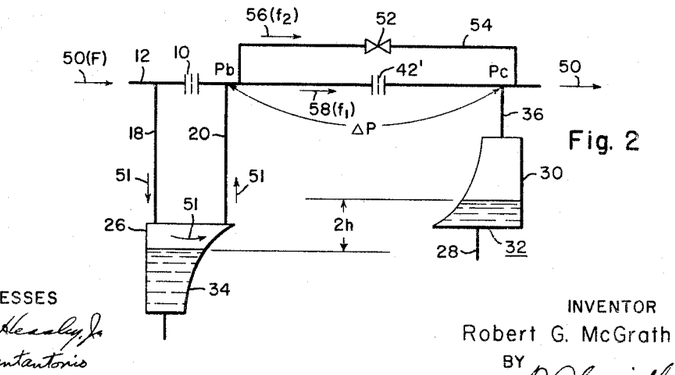
FIGURE 2 is a partial schematic diagram of the fluid circuit of another form of the invention and showing an arrangement for imparting a dual range to the radiation detecting arrangement and for improving the low flow range accuracy of the radiation readings.

Referring now to FIGURE 2 of the drawings, the general arrangement of the radiation detecting arrangement is generally similar to that of FIGURE 1, except that a bypass conduit 54 has been added and an orifice 42′ having a smaller diameter opening is used. This arrangement is used to make the manometer means 32 operable over two or more ranges of flow through the main conduit 12 without increasing the sizes of the chamber 26 and 30, with no decrease in accuracy in the high range of the main flow 50, and with an improvement in the accuracy in the low range of the main flow 50. The bypass conduit 54 taps into the main conduit 12 between the orifices 10 and 42′. The bypass conduit 54 is then routed around the orifice 42′ and taps back into the main conduit 12 downstream from the orifice 42′. A bypass valve 52 is installed in the bypass conduit 54 and is fully opened at the high flow range and completely closed at the low flow range. The materials of construction for the bypass valve 52 and the bypass conduit 54 are the same as used in the main conduit 12. The bypass conduit 54 is connected to the main conduit 12 by welding or by tapping at the two points of entry into the conduit 12.

Figure 6:
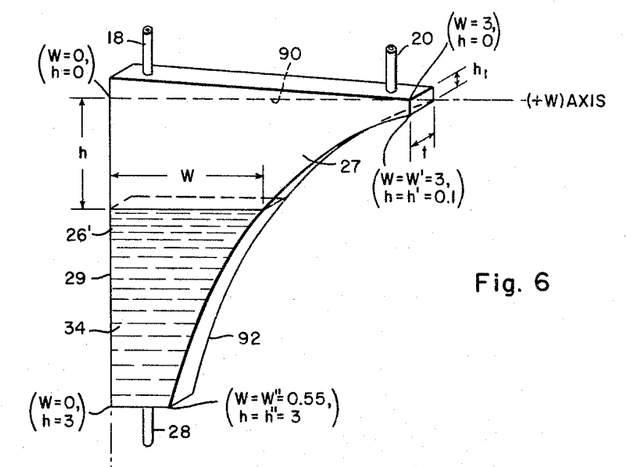
FIGURE 6 is an isometric view of an exemplary manometer chamber for use with the embodiments of the invention shown in FIGS. 1–3, and having a wedge-shaped addition at the top thereof to improve the accuracy of the radiation readings particularly at low flows.

Because it is impractical to construct the chambers 26 and 30 exactly according to the equation $V \approx h^{1/2}$ as $h$ approaches zero, an error is introduced into the reading $h$ of the manometer 32 when the main flow 50 is low. This can be explained by using the measuring chamber 26 as an example. The chamber 26 cannot be ideally constructed, because as $h$ approaches zero, the width $w$ of the chamber 26 approaches an infinite length. This can be seen from the following relations:

$$V \approx h^{1/2} \text{ and } V \approx \int_0^h w\,dh \quad (10)$$

therefore, $$kh^{1/2} = \int_0^h w\,dh \quad (11)$$

and by integrating $$w \approx \frac{1}{h^{1/2}} \quad (12)$$

where $V$, $w$, $h$ denote the parameters noted previously. It can be seen from the last term of Equation 12 that as $h$ approaches zero, $w$ approaches infinity. To make the measuring chamber 26 practical, a finite width $w$ must be selected, with the result that an error is introduced into the reading $h$ of the manometer means 32, when its fluid is only slightly displaced from the measuring chamber 26, i.e., when the level thereof is depressed a distance $h_1$ (FIG. 6) or less. In order to compensate for this error, in the arrangement of FIG. 2 the bypass conduit 54 is installed around orifice 42′ making the manometer 32 operable over two ranges, with no decrease in accuracy when the main flow 50 is high and an improvement in the accuracy of the low range when the main flow 50 is low.

The aforementioned results are obtained with the use of the bypass conduit 54, because the orifice 42′ is provided with a substantially smaller diameter opening to create a greater pressure drop for the same flow rate of the main flow 50 which results in a greater displacement of the manometer fluid 34 in the chamber 26. The manometer fluid 34 is, therefore, depressed beyond the distance $h_1$ (FIG. 6) for a substantially lower flow rate of the main flow 50 resulting in an increase in accuracy at the low flow rate.

When the main flow 50 increases to a point where the level of the manometer fluid 34 is depressed to the bottom of the measuring chamber 26, a portion of the main flow 50, as indicated by arrow 56, is bypassed around the orifice 42 to cause the level of the manometer fluid 34 to rise nearly to the top of the measuring chamber 26. The basic principle, just explained, is to bypass a portion of the main flow 50, as indicated by arrow 56, around the orifice 42′ when the main flow 50 is high and thus cause a reduction in the pressure drop across the orifice 42′. Therefore, when the valve 52 is opened for the high range, the same amount of flow, as indicated by arrow 58, is passed through the orifice 42′ as is the case when the valve 52 is closed for the low range of the main flow 50.

As a dual range has been provided in the flow circuit, a dual range will also have to be provided for the radiation detecting circuit. This can be provided by a means such as dual scales on the counting rate meter 46 and the recorder 48 or by making appropriate changes in the electrical circuits of the aforementioned instruments. The switching between the low to the high range scales can be accomplished by either manual means or automatic means for manipulating the bypass valve 52, as apparent to those skilled in the art. The switching is accomplished by fully opening (high range) or by fully closing (low range) the bypass valve 52. Operation of the bypass valve 52 can be done remotely; and, if desired, can be performed automatically by having the mercury in one of the chambers 26 or 30 make or break suitably disposed contacts (not shown).

Equations showing the characteristics of the modified arrangement presented in FIGURE 2 are as follows: Upon the same theory used to express Equations 1 and 3 supra, $$\Delta P = P_b - P_c = \tfrac{1}{2} f_1^2 = 2h \text{ or } f_1 = K_1 h^{1/2} \quad (13)$$

Similarly, $$f_2 = \frac{K_1}{K_2} h^{1/2} \quad (14)$$

By inspection of FIG. 2, $$F = f_1 + f_2 \quad (15)$$

By using Equations 13 and 14 in direct proportions, $$\frac{f_1}{f_2} = \frac{K_1}{K_2} \text{ or } f_2 = K_3 f_1 \qquad (16)$$

where:

$K_1$, $K_2$, $K_3$=arbitary constants,
$\Delta P$=pressure differential causing the displacement of the manometer fluid 34,
$P_b - P_c$=pressure drop across the orifice 42',
$f_1$=orifice flow, as indicated by arrow 58, which, incidentally, does not go through the bypass line 54,
$f_2$=flow, as indicated by arrow 56, through the bypass line 54,
$h$=height of the displaced manometer fluid 34, and
$F$=the main flow 50.

When the valve 52 is closed, $F=f_1$. This corresponds to the low flow case, and Equation 13 applies.

When the valve 52 is open $F=f_1+f_2$. This corresponds to the high flow case. By substituting Equation 16 for the $f_2$ term in Equation 15, the high flow can be expressed as follows:

$$F = (1+K_3)f_1 \qquad (17)$$

Transposing, $$f_1 \frac{1}{1+K_3} F = K_4 F \qquad \text{note } K_4 < 1 \qquad (18)$$

where $K_4 = \frac{1}{1+K_3}$

Equation 18, therefore shows that $f_1$, which is the main flow F less the bypass flow $f_2$, is proportional to the main flow F. Therefore, $f_1^2$ is proportional to $h$ per Equation 4.

Figure 3:
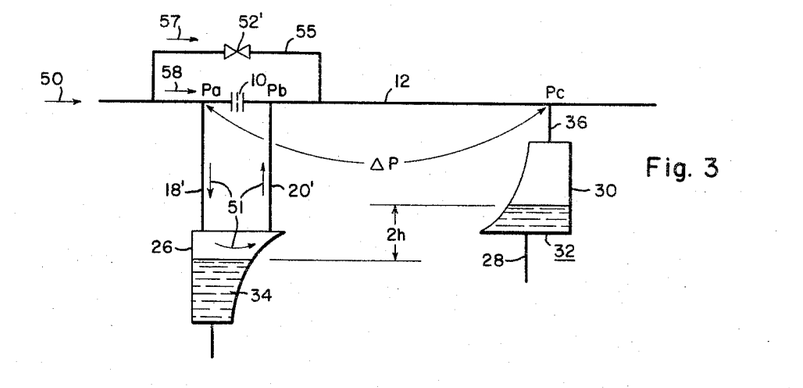
FIGURE 3 is a partial schematic diagram of the fluid circuit showing the arrangement of the invention as shown in FIGURE 2, but with a modified bypass configuration.

Referring now to FIGURE 3 of the drawings, a modified form of the radiation detecting arrangement shown previously in FIGURE 1 is presented in accordance with the invention. Therefore, the arrangement to be described is similar to FIGURE 1, except that the orifice 42 has been eliminated and the relative diameter sizes of the tubes 18 and 20 (FIG. 1) are different. The construction, materials, and operation for this arrangement are also generally similar to that described for FIGURE 1, except that the orifice 10 is the only pressure reducing means employed in the conduit 12 and is utilized, as explained above, to create the sampled flow 51 through the chamber 26. To displace the manometer fluid 34 in the chamber 26, the diameter of a tube 18' is made large in comparison with the diameter of a tube 20' to create a pressure in the chamber 26 which is but slightly below the pressure in the main conduit 12 on the upstream side of the orifice 10 whenever there is a main flow 50. The manometer means 32 is, therefore subjected to most of the pressure drop across the orifice 10, with the result that the manometer fluid 34 is displaced from the chamber 26 in much the same manner as described previously in connection with FIG. 1.

If desired, the radiation detecting arrangement of FIGURE 3 can be provided with a bypass line 55 and a bypass valve 52', which can produce a bypass flow 57 around the orifice 10. Therefore, with the addition of the bypass line 55, the arrangement of FIG. 3 is similar to FIGURE 2, except that the orifice 42 has been eliminated, the bypass line 55 has been located about the orifice 10, and the relative diameter sizes of the tubes 18 and 20 (FIG. 2) have been changed. The construction, materials, and operation of the latter modification of the invention are otherwise generally similar to that described for FIG. 2, particularly with reference to the bypass arrangement thereof.

The arrangement of FIG. 3 although simpler in design to the arrangements shown in FIGURES 1 and 2, has less flexibility in the selection of orifice, tubing, and chamber sizes. This is caused by the fact that in the example shown in FIG. 3, the bypass flow 57, the sampled flow 51, and the displacement of manometer fluid 34 are interrelated functions and the control of one function will limit the extent to which another function can be controlled.

Figure 4:
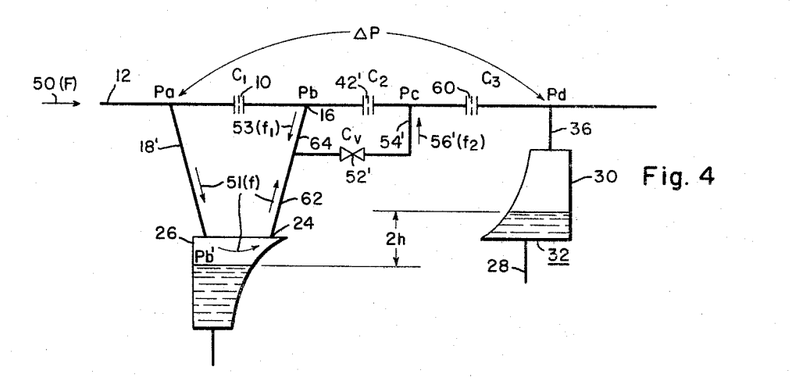
FIGURE 4 is a partial schematic diagram of the fluid circuit showing still another form of the invention adapted for imparting a dual range to the radiation detecting arrangement and for improving the low flow range accuracy of the radiation readings.

Turning now to FIGURE 4 of the drawings, another arrangement according to the invention, which is intended to provide greater flexibility in adapting to certain applications, is shown for producing the dual ranges and improved accuracy described above. This arrangement is similar to that shown in FIGURE 2, except that orifices 42' and 60 are used instead of the orifice 42, the relative diameter sizes of tubes 18' and 62 are different, and a bypass line 54' with a bypass valve 52' is used to bypass only the orifice 42'.

The orifices 42' and 60 are installed in the main conduit 12 between the entry points of a tube 64, and the tube 36 into the main conduit 12. The manner of installing orifices 42' and 60 is the same as previously described for the installation of the orifices 10 and 42 in FIGURE 1. The bypass line 54, is installed effectively across the orifice 42'. The inlet end of the bypass line 54' is coupled at the junction of the tubes 62 and 64, and the bypass valve 52' is installed in the bypass line 54'. The outlet end of the bypass line 54' is joined to the main conduit 12 at a point between the orifices 42' and 60. The diameter of the tube 18' is made large relative to the diameter of the tube 62 to create a pressure $P_b'$ in the chamber 26 which is only slightly below the pressure $P_a$ whenever there is a main flow 50. In this respective, the tubes 18' and 62 function as described in connection with the tubes 18' and 20' in FIG. 3. However, the diameter of the tube 64 is made sufficiently large to be capable of passing a sufficient quantity of a bypass flow 56' around the orifice 42' when the main flow 50 is high, and the diameter of the tube 54' desirably is made somewhat larger than the tubes 64 to accommodate both the bypass flow 53 and the sampled flow 51.

At low flows through the main conduit 12, the bypass valve 52' is closed and the sampled flow 51 will be diverted through the tube 18', through the measuring chamber 26, and through tubes 62 and 64. The manner of operation for the low flow condition is otherwise generally similar to that previously described for the arrangement shown in FIGURE 1 with the orifices 42' and 60 performing the same function as the orifice 42.

At high flows through the conduit 12, the bypass valve 52' is fully opened. The sampled flow 51 will then be diverted through the tube 18', through the measuring chamber 26, through the tube 62, though the bypass valve 52', through the bypass line 54', and back into the conduit 12 downstream of the orifice 42'. Part of the flow, as indicated by arrow 53, through the conduit 12 will also be diverted from the downstream side of the orifice 10, through the tube 64, through the bypass valve 52', through the bypass line 54', and back into the conduit 12 at a point downstream of the orifice 42'. The flow paths described above are shown by flow arrows in FIGURE 4. By closing the bypass valve 52', the manometer means 32 will measure the pressure drop across the orifices 10, 42' and 60; whereas, with the bypass valve 52' open, the manometer means 32 will measure a substantially lower pressure drop across the orifices 10, 42' and 60, as the pressure drop across the orifice 42' has been substantially reduced by the bypass flow 56'. In this example, orifice 10 provides only a sufficient pressure drop to create a small flow through the measuring chamber 26, orifice 42' provides the dual range for the manometer means 32, and orifice 60 provides the basic pressure drop required to operate the manometer means 32.

The advantages of the arrangement shown in FIG. 4 over FIG. 2 are flexibility in selecting tubing, chamber and orifices sizes and better regulation of the parameters being controlled, in certain applications of the invention. This can be readily understood from the fact that the orifice 10 is sized to control a flow $f$ through the chamber 26, the orifice 42' is sized to control a bypass flow $f_1$ around itself, and the orifice 60 is sized to control primarily the displacement of the manometer fluid 34 which in turn controls the sizes of the chambers 26 and 30.

In order to show that this arrangement will satisfactorily give two ranges of operations and to determine the relationships of the various flows, the following equations are presented. The pressure drops across the valve 52' and the various orifices (see FIG. 4) are calculated and then summed to obtain the total pressure drop ΔP across the manometer means 32. Considering that, obviously, $$f_2 = f + f_1 \quad (19)$$

the various pressure drops are related to the square of the flow as multiplied by certain constants as shown below:

$$P_a - P_b = C_1(F-f)^2 \quad (20)$$
$$P_c - P_d = C_3 F^2 \quad (21)$$
$$P_b - P_c = C_2(F-f-f_1)^2 \quad (22)$$
$$P_b - P_c = C_v f_2^2 \quad (23)$$

where:

$P_a$, $P_b$, $P_c$, and $P_d$ = pressures at the points shown in FIG. 4.
$F$, $f$, $f_1$, and $f_2$ = flows at the locations shown in FIG. 4.
$C_1$, $C_2$, $C_3$, and $C_v$ = constants relating pressure drop to the square of the flow for the component shown directly beneath each of such constants in FIG. 4.

(a) *Case I*

The bypass valve 52' is closed for the low main flow 50; therefore, $f_2 = 0$ and from Equation 23:

$$f_1 = -f \quad (24)$$

Also:

$$f = CF \quad (25)$$

where $C$ = proportionality constant.

By substituting Equation 25 in Equation 20, $$P_a - P_b = C_1(F-CF)^2 = C_1(1-C)^2 F^2 \quad (26)$$

By substituting Equation 24 in Equation 22, $$P_b - P_c = C_2 F^2 \quad (27)$$
$$P_c - P_d = C_3 F^2 \quad (21)$$

By adding Equations 27 and 21

$$P_b - P_d = (C_2 + C_3) F^2 \quad (28)$$

By adding Equations 26 and 28, $$\Delta P = P_a - P_d = C_1(1-C)^2 F^2 + (C_2 + C_3) F^2 = [C_1(1-C)^2 + C_2 + C_3] F^2 \quad (29)$$

This is the desired result because in Equation 29 ΔP is proportional to $F^2$, which establishes the same relationship as Equation 1; therefore, substituting ΔP for $F^2$ in Equation 4 will show that ΔP is also proportional to $h$.

(b) *Case II*

The bypass valve 52' is open for the high main flow 50; Therefore, $$f_2 = f + f_1 \quad (19)$$

assume $$C_v = k^2 C_2 \quad (30)$$

where $k^2$ is a constant

From Equations 20 and 26:

$$P_a - P_b = C_1(F-f)^2 = C_1(1-C)^2 F^2 \quad (31)$$

From Equations 22 and 23:

$$P_b - P_c = C_2(F-f-f_1)^2 = C_v f_2^2 \quad (32)$$

By substituting Equations 19 and 30 in Equation 32, $$P_b - P_c = C_2(F-f_2)^2 = k^2 C_2 f_2^2 \quad (33)$$

Simplifying Equation 33, $$F - f_2 = k f_2 \quad (34)$$

Transposing, $$f_2 = \frac{F}{1+k} \quad (35)$$

By substituting Equation 35 in Equation 33, $$P_b - P_c = k^2 C_2 \left(\frac{F}{1+k}\right)^2 = \left(\frac{k}{1+k}\right)^2 C_2 F^2 \quad (36)$$

$$P_c - P_d = C_3 F^2 \quad (21)$$

By adding Equations 36 and 21, $$P_b - P_d = \left[\left(\frac{k}{1+k}\right)^2 C_2 + C_3\right] F^2 \quad (37)$$

By adding Equations 31 and 37, $$\Delta P = P_a - P_d = \left[C_1(1-C)^2 + \left(\frac{k}{1+k}\right)^2 C_2 + C_3\right] F^2 \quad (38)$$

Again this is the desired relationship, because in Equation 38 ΔP is proportional to $F^2$, which establishes the same relationship as Equation 1; therefore, substituting ΔP for $F^2$ in Equation 4 will show that ΔP is also proportional to $h$.

The constants can be chosen so as to give the same relationships as were obtained in the method described for FIGURE 2 of obtaining a dual range manometer. As the flow circuit is dual range, a dual range scale or the like (not shown) must also be provided for the radiation detecting circuit as previously described for FIG. 2.

Figure 5:
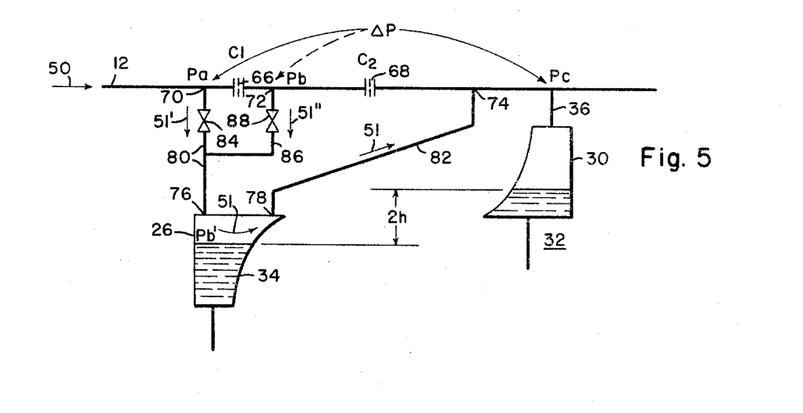
FIGURE 5 is a partial schematic diagram of the fluid circuit showing a modified arrangement of the invention shown in FIGURE 4.

Turning now to FIGURE 5 of the drawings, another arrangement according to the invention is shown for producing the dual ranges and improved accuracy described in connection with FIGURE 2. This arrangement is generally similar to the arrangement shown in FIGURE 4, except that one of the orifices has been eliminated, the bypass arrangement has been relocated, and the means for obtaining a dual range has been modified.

The installation of orifices 66 and 68, the manometer means 32, the tube 36, the detector 44, the counting rate meter 46, and the recorder 48 is substantially the same as that described for FIGURE 1. Taps 70 and 72 are provided in the main conduit 12 on each side of the orifice 66. A tap 74 is provided in the main conduit 12 downstream of the orifice 68. Similarly taps 76 and 78 are provided in the top of the measuring chamber 26 and adjacent the extreme upper ends of the chamber 26. Tubes 80 and 82 couple the taps 70 and 74 to the taps 76 and 78, respectively. A valve 84 is installed in the tube 80 as by welding, the use of flanges, or threading. A tube 86 couples the tap 72 to the tube 80 at a point between the valve 84 and the tap 76. A bypass valve 88 is installed in the tube 86. The diameters of the tubes 80 and 86 are made relatively large to the diameter of the tube 82 to create a pressure $P_b'$ in the chamber 26 which is only slightly below the pressure $P_a$ or $P_b$, depending upon whether the valve 84 or 88 is opened, in the main conduit 12 on the upstream or downstream side, respectively, of the orifice 66 whenever the main flow 50 occurs.

When the main flow 50 is low, the valve 84 is fully opened and the valve 88 is completely closed. With this arrangement the sampled flow 51, indicated by arrow 51', and the displacement of the manometer fluid 34 in the measuring chamber 26 is produced by a pressure drop ΔP between the points $P_a$ and $P_c$ across both the orifices 66 and 68. The path of the sampled flow 51 is from the main conduit 12 at a point upstream of the orifice 66, through the valve 84, through the tube 80, through the measuring chamber 26, through the tube 82, and into the main conduit 12 at a point downstream of the orifice 68. This flow path, indicated by arrows 51' and 51, is shown in FIG. 5.

When the main flow 50 is high, the valve 84 is completely closed and the valve 88 is completely opened. With this arrangement the sampled flow 51, indicated by arrow 51″, and the displacement of the manometer fluid 34 is produced by the pressure drop ΔP between the points $P_b$ and $P_c$ across the orifice 68, only. The path of the sampled flow 51″ is from the main conduit 12 at a point between the orifices 66 and 68, through the valve 88, through the tubes 86 and 80, through the chamber 26, through the tube 82, and into the main conduit 12 at a point downstream of the orifice 68. The flow path, indicated by arrows 51″ and 51, is shown in FIG. 5. As only the orifice 68 is utilized to create the pressure drop ($\Delta P = P_b - P_c$), the latter drop is substantially reduced from the pressure drop ($\Delta P = P_a - P_c$) obtained by utilizing both the orifices 66 and 68. Therefore, the displacement of the manometer fluid 34 in the measuring chamber 26 is also substantially reduced. By the proper selection of the orifices 66 and 68, the measuring chamber 26 can be made to operate over a dual range of flows in the main conduit 12, as previously described for FIG. 2.

In certain applications, the valve 88 can be eliminated. When the main flow 50 is high, the elimination of the valve 88, of course, has no effect on the proper operation of this arrangement as the valve 88 is in the fully open position. However, when the main flow 50 is low, the elimination of the valve 88 would ordinarily cause a portion of the main flow 50 to bypass orifice 66 without passing through the measuring chamber 26. However, this can be compensated by reducing the diameter of the tube 86 used in this arrangement and thus obtain a suitable differential in flow of the sampled flow 51 during the opened and closed positions of the valve 84.

Referring now to FIGURE 6 of the drawings a means for improving the accuracy of the radiation readings is shown. This drawing shows the general shape of a measuring chamber 26′, which makes the change in height ($h$) of the manometer fluid 34 directly proportional to the main flow 50 in the main conduit 12. Also shown is a correction volume 90 at the top of the chamber 26′. The correction volume 90 can be shaped in a plurality of configurations and can be located on the chamber 26′ in a plurality of positions. In this embodiment, the correction volume 90 is designed as a wedge-shaped section positioned at the top of the chamber 26′. The correction volume 90 compensates for the volume deficiency created by making the width at the top of the chamber 26′ finite. If a high degree of accuracy is not required, the correction volume 90 can be omitted, particularly when the main flow 50 is high. As pointed out previously in reference to FIGURE 5, the desired relationship is to have the volume of manometer fluid displaced within the chamber 26′ proportional to the flow in the main conduit 12. Thus, the shape of the chamber 26′ is determined by Equation 8 $V = CF$.

In the manometer means 32, the main flow 50 is proportional to the square root of displaced height of the manometer fluid 34, as explained previously in reference to FIGURE 1 per Equation 5 $F = k_2 h^{1/2}$ Combining Equations 5 and 8, $$V = k^1 h^{1/2} \quad (39)$$

where $k^1 = Ck_2$, a proportionality constant.

Differentiating Equation 39:

$$dV = \tfrac{1}{2}\frac{k^1}{h^{1/2}}dh \quad (40)$$

but $$dV = (wdh)(t) \quad (41)$$

where $w$ = the width of measuring chamber 26′
$t$ = the constant thickness of the chamber 26′

From Equations 40 and 41:

$$(wdh)(t) = \tfrac{1}{2}\frac{k^1}{h^{1/2}}dh \quad (42)$$

and simplifying Equation 42, $$w = \frac{k_1}{h^{1/2}}dh \quad (43)$$

which is the equation defining the form of the chamber 26′ and in particular the shape of the arcuate wall 92; and where, simplifying Equation 42

$$k_1 = \frac{k^1}{2t}$$

which is also a constant since the thickness $t$ is invariable in this example.

Note that $k_1$ can have virtually any value, as it is dependent on the size selected for the chamber 26′ per Equations 8 and 39 supra. The only limitation is that chamber 26′ be of reasonable size for ease of manufacture and to remain within the scanning range of the detector 44. Therefore, in the construction of the reasonably sized measuring chamber 26′ and also in remaining within manufacturing ease, it is assumed that $w = 3$ inches and $h = 0.1$ inch at the coordinates ($w'$, $h'$) shown in FIG. 6. For this specific Example a ($w$) axis, and ($h$) axis, and the coordinates ($w = 0$, $h = 0$) assigned to the intersection of the $w$ and $h$ axes are shown in FIG. 6. From Equation 43

$$k_1 = wh^{1/2} = 3\sqrt{.1} = .95 \quad (44)$$

Then, by substituting in Equation 43

$$w = \frac{.95}{h^{1/2}} \quad (45)$$

Also assume that the thickness $t$ (a constant) for the chamber 26′ is made one-fourth of an inch, which is still within the limitations previously described. Then by integrating Equation 41 and substituting 0.25 for $t$ and substituting Equation 45 in equation 41:

$$V = \tfrac{1}{4}\int_0^{+h}\frac{.95}{h^{1/2}}dh = .475h^{1/2} \text{ inch}^3 \quad (46)$$

The total volume of the chamber 26′ in this example is then obtained by making $h$ equal to 3 inches, which again is a reasonable limitation in size. Thus, by substituting $h = 3$ in Equation 46

$$V = .475\sqrt{3} = .824 \text{ cu. inch} \quad (47)$$

Also by substituting $h = 3$ in Equation 45, the width $w$ in inches can be obtained at the coordinates ($w''$, $h''$) shown in FIG. 6 for the chamber 26′. Therefore, $$w = \frac{.95}{h^{1/2}} = \frac{.95}{\sqrt{3}} = 0.55 \quad (48)$$

The above describes an ideal chamber; however, the ideal chamber cannot be constructed, pointed out previously, because as $h$ approaches zero, the width $w$ of the chamber approaches an infinite length, which is an asymptotic relationship as shown by Equation 45. For the practical chamber a finite width $w$ must therefore be selected. The width which is selected should be one which satisfies three requirements: (a) the errors introduced by the finite width selection should be small, (b) the chamber should have reasonable proportions, and (c) there should be no deep crevices in the internal structure of the chamber. In an ideal chamber, for small $h$ and large $w$ the chamber becomes quite pointed and it will be difficult for a non-wetting manometer liquid, such as mercury, to fill the crevice, which will be formed in the area where the slope of the arcuate wall 92 approaches the horizontal direction. With these criteria in mind, assume for the chamber 26′ that for $0 \leq h_1 \leq 0.1$ inch, $w$ is constant and equal to 3 inches. The error introduced by eliminating the pointed section of the chamber 26′ beyond the width $w$ of 3 inches is as follows:

The theoretical volume using Equation 46 for that portion of the chamber 26′ as indicated by $h_1 = 0.1$ inch and from $w = 0$ to $w = \infty$ is $$V = .475 \times (.1)^{1/2} = .15 \text{ cu. inch} \quad (49)$$

However, with the assumption of the finite width ($w=3$ inches) the actual volume of the above mentioned portion $h_1$ (from $w=0$ to $w=3$) is $$V = (.1)\left(\frac{1}{4}\right)(3) = 0.075 \text{ cu. inch} \quad (50)$$

Thus there is an error $0.15 - 0.075 = 0.075$ cu. inch. Unless compensation for this volume deficiency is made, there will be an error in the chamber 26′ ranging from 50% for $h=0.1$ inch to about 9%

$$\left(\frac{.075}{.824} \times 100\right)$$

based on an actual volume of .824 from Equation 47, for $h=3$ inches. This error can be compensated at least for the higher flow rates by properly calibrating the circuit for the radiation detecting instruments.

The above-mentioned error can also be eliminated and the arrangement can thus be used with ordinary metering circuitry by adding the correction volume 90 of 0.75 cu. inch, for the example given, to the measuring chamber 26′. The correction volume 90, which in this embodiment is wedge-shaped, can be added to a plurality of locations on the chamber 26′; but desirably it is added to the top of the chamber 26′, so that the largest possible range of the instrument can be corrected. The manner in which this is corrected for the chamber 26′ is shown by FIGURE 6, where the correction volume 90 represents the 0.075 cu. inch volume that has been added. There is no error in the part of the chamber 26′ where $h \geq 0.1$ inch, since the arcuate wall 92 is still following the asymptotic curve; but the error increases rapidly as $h$ approaches zero. However, $h < 0.1$ inch corresponds to very low flows in the main conduit 12, and errors may be tolerated in this range. The actual volume $V_{act}$, for the chamber 26′ for any volume where $h \leq 0.1$ inch which also includes the correction volume 62, is given by the following equation:

$$V_{act} = 0.075 + \left(\frac{1}{4}\right)(3)(h) \quad (51)$$

$V_{act}$, for the chamber 26′ for any volume where $h > 0.1$ inch which also includes the correction volume 90, is given by the following equation:

$$V_{act} = 0.475 h^{1/2} \quad (46)$$

Another effect of the correction volume 90 is that, even at zero flow in the main conduit 12, the detector 44 will receive some radiation since it will "see" a portion of the sampled flow 51 remaining in the correction volume 90. This is due to the fact that, at zero flow in the main conduit 12, the manometer fluid 34 does not enter the correction volume 90, because the level of the manometer fluid 34 was originally set only to reach the bottom of the correction chamber 90, which corresponds to the top of the chamber 26 (FIG. 1) when the main flow 50 was zero. Other than the fact that there is no "zero" on the detector 44 this is not a serious concern. Actually there is an advantage that may be attributed to the added correction volume 90. By decreasing the flow in the conduit 12 to zero or by valving off the manometer means 32 in a known manner without changing the flow in the conduit 12, a measure of the specific activity of the fluid in the conduit 12 can be determined at any given time. The activity can be measured by the detector 44; and since the correction volume 90 of the source is known (0.075 cu. inch in this case), the specific activity is likewise known or can easily be computed.

The two chambers 26 and 30 (FIGS. 1 and 2) are used since the liquid displaced in the measuring chamber 26 must have some place to go. The collection chamber 30 need not be shaped similarly to the measuring chamber 26; however, the circuit for the radiation detecting instruments would have to be calibrated to offset the effect of the differently shaped collection chamber 30. The collection chamber 30 (FIGS. 1 and 2), which would be used with that shown in FIG. 6, differs therefrom in that it need not have the added correction volume.

Figure 7:
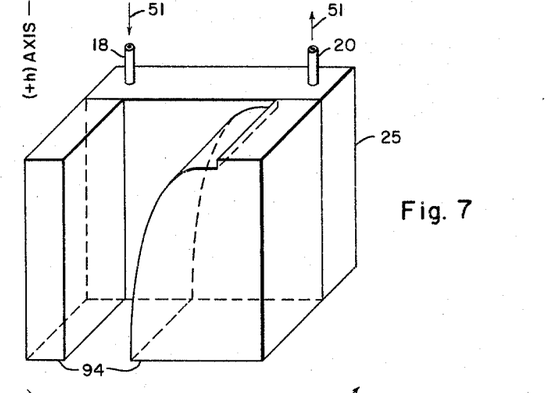
FIGURE 7 is an isometric view of another exemplary form of the manometer chamber and having external shielding employed to improve the radiation readings and particularly the response time of the radiation detecting arrangement.

Referring now to FIGURE 7 of the drawings, a method of improving the response time of the radiation detecting means by the use of external shielding 94 attached to a rectangularly shaped measuring chamber 25 is shown. The response time of the radiation detecting means will be affected when the sampled flow 51 passes through the chamber 25 by the inlet and exit flow conditions of the chamber 25, by the inlet and exit velocities of the sampled flow 51 and by the steadiness of the manometer fluid 34. These are all factors determining the degree to which the incoming radioactive fluid of the sampled flow 51 mixes with the radioactive fluid already in the chamber 25. Eddy currents will also be set up within the chamber 25, because of the abrupt change of direction of the sampled flow 51 within the chamber 25. It is also likely that there will be small areas, such as the corners of the chamber 26 (FIGS. 1 and 2) where there will be very little mixing of the old and new radioactive fluids because the corners will not be immediately sought out by the incoming sample of radioactive fluid. Also, any minor pulsations in the sampled flow 51 will accelerate the mixing in the measuring chamber by a "pumping" action.

One method of improving the response of the radiation detecting arrangement is to avoid the "corner" effects, described above, of the chamber 25 upon the radioactive fluid as it enters and leaves the chamber 25 through the tubes 18 and 20, respectively. This can be accomplished by making the chamber 25 larger than necessary and then properly shielding the chamber 25 to produce the desired coordination between displacement of the manometer fluid 34 and rate of flow in the main conduit 12. As seen by FIGURE 7, the external shielding 94 (desirably lead) is shaped so that the unshielded area of the chamber 25 has substantially the same configuration as was discussed for the measuring chamber 26′ in FIGURE 6, except that the correction volume 90 (FIG. 6) has been omitted. It is understood, of course, that the chamber 25 and the shielding 94 can be respectively shaped to add the correction volume, if desired.

The chamber 25 should not be very thick, because errors will be introduced by radiation leakage past the shielding 94 from outside the area exposed by the shielding 94 and then detected by the detecting means 44 (FIG. 1). This is particularly true where the external shielding 94 is relatively thin as compared to the thickness of the chamber 25, because in this example the detecting means 44 (FIG. 1) can detect radiation originating from behind the area which should have been shielded by the external shielding 94, resulting in an erroneous radiation reading. Furthermore, the attenuation effect of the fluid upon the radiation originating adjacent the side of the chamber 25 opposite the radiation detector 44 will introduce an error in the radiation reading, if the thickness of the chamber is too great.

Figure 8:
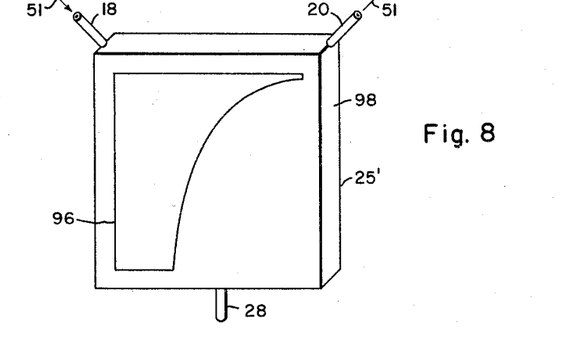
FIGURE 8 is an isometric view showing still another form of the manometer chamber and illustrating its combination with a scintillation crystal of an external radiation detector employed with the radiation measuring arrangement.

Referring now to FIGURE 8 of the drawings, another method of improving the response of the radiation detecting arrangement is shown. The arrangement shown in FIGURE 8 offers a different solution to the same problem previously discussed for FIGURE 7. In the arrangement shown in FIGURE 8, a crystal 96 of a scintillation detector is shaped, for example, according to the square root relationship previously discussed for FIGURE 6. The crystal 96 is then fastened to a rectangularly or other suitably shaped measuring chamber 25′ which can be of any convenient size greater than the crystal 96. The chamber 25′ can be made large enough to ensure that a representative fluid sample is in the chamber 25′, while the crystal 96 can be kept reasonably small. The chamber 25′ should not be very thick, for example, not greater than 1″ and desirably of the order of ¼″ or less, because errors will be introduced by the attenuation effect of the fluid upon the radiation originating adjacent the side of chamber 25′ opposite the crystal 96. Therefore, the chamber 25' is to be constructed so as to contain as small a width of radioactive fluid as manufacturing methods permit. Another cause of error introduced into the radiation reading by too thick a chamber 25' is that a greater amount of angular radiation from the fluid will strike the crystal 96 and this type of radiation pickup desirably is kept to a minimum.

In this example, the crystal 96 emits light signals or photons when exposed to radiation. These photons are then picked up by a photomultiplier tube (not shown), which amplifies the light signal proportionately to the amount of radiation emitted from the chamber 25'. The amplified signal from the photomultiplier tube can be further amplified, if necessary, and recorded by any standard means known to those skilled in the art to indicate the total amount of radiation detected.

With reference to FIG. 8 of the drawings, another means of improving the response time is to have the tubes 18 and 20 enter the top corners of the chambers 26, 26', 25 or 25', desirably at an angle, e.g. 45°, to the vertical side wall 98 of the chamber. This will cause the sampled flow 51, to enter and leave the top two corners of the chamber 25' desirably at an angle which will reduce or eliminate the eddy currents and stagnant regions described previously in connection with FIGURE 7.

In each of FIGURES 6 and 7 a common measuring volume, which the detector 44 sees, has been defined. The shape of the volume exposed to the detector 44 is such that a change in the level of the manometer fluid 34 will expose a volume of the sample flow 51 proportional to the square root of $h$, and hence to the rate of fluid flow in the conduit 12, where $h$ equals the height of the displaced manometer fluid 34. In FIGURE 6, the measuring chamber 26 is shaped to produce this result. In FIGURE 7, the external shielding 94 is shaped to produce the desired result. In FIGURE 8, the crystal 96 of a scintillation detector (not shown) is shaped to produce this result. The shape described above permits the detector 44 or crystal 96 to produce a linear reading. However, a linear reading could also be recorded, without the use of a specially shaped volume exposed to the detector 44 or crystal, by introducing proper circuitry or calibration in the radiation detector instrumentation.

The aforementioned shape described in FIGS. 6, 7 and 8 can also be altered to coordinate the manometer level to some other function. It is also to be understood that the essence of the invention is the use of means, such as a manometer arrangement, which is responsive to the rate of flow or some other function of the flowing or moving radioactive material, to determine the amount of the material to be exposed to radiation detecting means. Thus, the radiation detecting means integrates the specific activity of the material and its rate of flow or other function to give a reading which is the direct result of at least two variables. In the example described, the variables are specific activity of the fluid and its rate of flow through the conduit 12.

From the foregoing, it is apparent that a novel and efficient radiation detecting arrangement has been disclosed therein. Although the invention has been described with particularity, it is understood that the present disclosure has been made by way of illustrative examples of the invention and that numerous changes in the details of construction and the combination and arrangement of parts may be resorted to without departing from the spirit and the scope of the invention as hereinafter claimed. It is also contemplated that certain features of the invention can be employed without a corresponding use of other features thereof.

Therefore what is claimed as new is:

1. An arrangement for measuring radioactivity of a flowing fluid in a conduit, said arrangement comprising means for withdrawing a sample of said fluid, means responsive to the flow rate of said fluid for controlling said sampling means so that the amount of said fluid sample is proportional to the flow rate of said fluid, and means for detecting the amount of radioactivity in said fluid sample.

2. An arrangement for measuring radioactivity of a flowing fluid in a fluid system having pressure reducing means within said system, said arrangement comprising means for withdrawing a sample of said fluid from said system, means responsive to said presusre reducing means for controlling said sampling means so that the amount of said fluid sample is proportional to the pressure drop in said system, and means for detecting the total amount of radioactivity in said fluid sample so that an integrated total amount of radioactivity passing through said system is indicated.

3. An arrangement for measuring radioactivity of a flowing fluid in a conduit, said arrangement comprising a sampling means coupled to said conduit for continuously extracting a fluid sample therefrom, a reservoir for said fluid sample coupled to said sampling means, means controlled by the rate of flow of said fluid for actuating said sampling means to control the amount of said fluid sample in said reservoir, and means for detecting the total amount of radioactivity in said fluid sample so that the total amount of radioactivity passing through said conduit is indicated.

4. An arrangement for measuring radioactivity of a flowing fluid in a conduit, said arrangement comprising a measuring chamber, means for circulating at least a portion of said fluid through said measuring chamber, a manometer tube coupled to said measuring chamber, a manometer fluid filling at least a portion of said manometer tube and said measuring chamber, means for displacing said manometer fluid so that the displacement is proportional to the rate of fluid flow in said conduit, and radiation detecting means for determining the radioactivity of said fluid portion in said measuring chamber.

5. An arrangement for measuring radioactivity of a flowing fluid in a conduit, said arrangement comprising a measuring chamber, means for circulating through said measuring chamber a portion of said fluid, a collection chamber, a manometer tube connecting said measuring chamber to said collection chamber, a manometer fluid filling at least a portion of said manometer tube and said measuring chamber, means for displacing said manometer fluid from said measuring chamber into said collection chamber so that the displacement is proportional to the rate of fluid flow in said conduit, and radiation detecting means for determining the radioactivity of said fluid portion in said measuring chamber.

6. An arrangement for measuring radioactivity of a flowing fluid in a conduit, said arrangement comprising a measuring chamber shaped to define a measuring volume proportional to a given function of said fluid flow in said conduit, means for circulating at least a portion of said fluid through said measuring chamber, a manometer tube coupled to said measuring chamber, a manometer fluid filling at least a portion of said manometer tube and said measuring chamber, means for displacing said manometer fluid so that the displacement is proportional to the rate of flow in said conduit, and radiation detecting means for determining the radioactivity of said fluid portion in said measuring chamber.

7. An arrangement for measuring radioactivity of a flowing fluid in a conduit, said arrangement comprising a generally rectangularly shaped measuring chamber having one side arcuately shaped to reduce the cross-sectional area towards the bottom thereof, means for circulating at least a portion of said fluid through said measuring chamber, a manometer tube coupled to said measuring chamber, a manometer fluid substantially filling said manometer tube and said measuring chamber, means responsive to the flow rate of said fluid for displacing said manometer fluid so that the displacement is directly proportional to said flow rate, and radiation detecting means for determining the radioactivity of said fluid portion in said measuring chamber.

8. An arrangement for measuring radioactivity of a flowing fluid in a conduit, said arrangement comprising a pressure reducing means coupled in said conduit, a measuring chamber, an inlet tube coupling the inlet end of said measuring chamber to said conduit at the high pressure side of said pressure reducing means and having a sufficiently large diameter to minimize the pressure drop between said conduit and said measuring chamber, an outlet tube coupling the outlet side of said measuring chamber to said conduit at the low pressure side of said pressure reducing means and having a sufficiently small diameter to control the circulation of a portion of said flowing fluid through said measuring chamber, a collection chamber, an additional conduit means connecting said collection chamber and said conduit at the low pressure side of said pressure reducing means, a manometer tube coupled to said collection chamber and said measuring chamber, a manometer fluid substantially filling said manometer tube and said measuring chamber, said manometer fluid being displaced by said pressure reducing means so that the amount of displacement is proportional to the rate of fluid flow in said conduit, and radiation detecting means for determining the radioactivity of said fluid portion in said measuring chamber.

9. An arrangement for measuring radioactivity of a flowing fluid in a conduit, said arrangement comprising a first pressure reducing means coupled in said conduit, a measuring chamber, means for circulating a portion of said fluid through said measuring chamber, said circulating means including conduit means coupled to said measuring chamber and to said conduit across said first pressure reducing means, a second pressure reducing means coupled in said conduit adjacent to said first pressure reducing means, a collection chamber, an additional conduit means connecting said collection chamber and said conduit at the low pressure side of said second pressure reducing means, a manometer tube coupled to said collection chamber and said measuring chamber, a manometer fluid which is immiscible with said fluid portion substantially filling said manometer tube and said measuring chamber, said manometer fluid being displaced by at least said second pressure reducing means so that the amount of displacement is proportional to the rate of fluid flow in said conduit, and radiation detecting means for determining the radioactivity of said fluid portion in said measuring chamber.

10. An arrangement for measuring radioactivity of a flowing fluid in a conduit, said arrangement comprising a first pressure reducing means coupled in said conduit, a measuring chamber, means for circulating a portion of said fluid through said measuring chamber, said circulating means including conduit means coupled to said measuring chamber and to said conduit across said first pressure reducing means, a second pressure reducing means coupled in said conduit adjacent to said first pressure reducing means, a collection chamber, additional conduit means connecting said collection chamber and said conduit at the low pressure side of said second pressure reducing means, a manometer tube communicating with said collection chamber and said measuring chamber, a manometer fluid which is immiscible with said fluid portion normally substantially filling said manometer tube and said measuring chamber so that said manometer fluid is displaceable by said second pressure reducing means so that the displacement is proportional to the rate of fluid flow in said conduit, means for selectively bypassing a second portion of said fluid around said second pressure reducing means to enable the displacement of said manometer fluid within said measuring chamber in accordance with a different range of flow rates in said conduit in order to extend the range of said flow rates over which said arrangement is operable, and radiation detecting means for determining the radioactivity of said fluid portion in said measuring chamber.

11. An arrangement for measuring radioactivity of a flowing fluid in a conduit, said arrangement comprising means for withdrawing a sample of said fluid, means responsive to the flow rate of said fluid for controlling said sampling means so that the amount of said fluid sample is proportional to the flow rate of fluid, means for selectively bypassing a second portion of said fluid around said sample withdrawing means to produce the same proportionate amount of said fluid sample in accordance with a different range of flow rates in said conduit in order to extend the range of said flow rates over which said arrangement is operable, and radiation detecting means for determining the radioactivity of said proportionate fluid sample.

12. An arrangement for measuring radioactivity of a flowing fluid in a conduit, said arrangement comprising a pressure reducing means coupled in said conduit, a measuring chamber, an inlet tube coupling the inlet end of said measuring chamber to said conduit at the high pressure side of said pressure reducing means and having a sufficiently large diameter to minimize the pressure drop between said conduit and said measuring chamber, an outlet tube coupling the outlet side of said measuring chamber to said conduit at the low pressure side of said pressure reducing means and having a sufficiently small diameter to control the circulation of a portion of said flowing fluid through said measuring chamber, a collection chamber, an additional conduit means connecting said collection chamber and said conduit at the low pressure side of said pressure reducing means, a manometer tube coupled to said collection chamber and said measuring chamber, a manometer fluid substantially filling said manometer tube and said measuring chamber, said manometer fluid being displaced by said pressure reducing means so that the amount of displacement is proportional to the rate of fluid flow in said conduit, means for selectively bypassing a second portion of said fluid around said pressure reducing means to produce the same amount of displacement proportional to the rate of fluid flow in said conduit in accordance with a different range of flow rates in said conduit in order to extend the range of said flow rates over which said arrangement is operable, and radiation detecting means for determining the radioactivity of said fluid portion in said measuring chamber.

13. An arrangement for measuring radioactivity of a flowing fluid in a conduit, said arrangement comprising a first pressure reducing means coupled in said conduit, a measuring chamber, means for circulating a sample of said fluid through said measuring chamber, said circulating means including conduit means coupled to said measuring chamber and to said conduit across said first pressure reducing means, a second pressure reducing means coupled in said conduit adjacent to said first pressure reducing means, a collection chamber, a manometer tube connecting said measuring chamber to said collection chamber, a manometer fluid filling at least a portion of said manometer tube and said measuring chamber, means for displacing said manometer fluid from said measuring chamber into said collection chamber so that the displacement is proportional to the rate of fluid flow in said conduit, means for selectively bypassing a second portion of said fluid and said fluid sample around said second pressure reducing means to enable the displacement of said manometer fluid within said measuring chamber in accordance with a different range of flow rates in said conduit in order to extend the range of said flow rates over which said arrangement is operable, a third pressure reducing means coupled in said conduit adjacent to said second pressure reducing means, an additional conduit means connecting said collection chamber and said conduit at the low pressure side of said third pressure reducing means, and radiation detecting means for determining the radioactivity of said fluid portion in said measuring chamber.

14. An arrangement for measuring radioactivity of a flowing fluid in a conduit, said arrangement comprising a first pressure reducing means coupled in said conduit, a measuring chamber, means for withdrawing a sample of said fluid from the high pressure side of said first pressure reducing means and circulating said fluid sample through said measuring chamber, a second pressure reducing means coupled in said conduit adjacent to said first pressure reducing means, a manometer tube coupled to said measuring chamber, a manometer fluid filling at least a portion of said manometer tube and said measuring chamber, means for displacing said manometer fluid so that the displacement is proportional to the rate of fluid flow in said conduit, means for selectively withdrawing said fluid sample from the low pressure side of said first pressure reducing means and circulating said fluid sample through said measuring chamber to enable the displacement of said manometer fluid within said measuring chamber in accordance with a different range of flow rates in said conduit in order to extend the range of said flow rates over which said arrangement is operable, and radiation detecting means for determining the radioactivity of said fluid sample in said measuring chamber.

15. An arrangement for measuring radioactivity of a flowing fluid in a conduit, said arrangement comprising a generally rectangularly shaped measuring chamber having one side arcuately shaped to reduce the cross-sectional area towards the bottom and having a correction container secured adjacent an edge attached to said chamber, means for circulating a sample of said fluid through said measuring chamber, a manometer tube coupled to said measuring chamber, a manometer fluid filling at least a portion of said manometer tube and said measuring chamber, means for displacing said manometer fluid so that the displacement is proportional to the rate of flow in said conduit, and radiation detecting means for determining the radioactivity of said fluid sample in said measuring chamber.

16. An arrangement for measuring radioactivity of a flowing fluid in a conduit, said arrangement comprising a measuring chamber, means for circulating at least a portion of said fluid through said measuring chamber, a manometer tube coupled to said measuring chamber, a manometer fluid filling at least a portion of said manometer tube and said measuring chamber, means for displacing said manometer fluid so that the displacement is proportional to the rate of flow in said conduit, radiation detecting means for determining the radioactivity of said fluid portion in said measuring chamber and radiation shielding means disposed between said fluid and said radiation detecting means, said shielding means being so shaped to expose a measuring volume of said chamber to said detecting means and proportional to the rate of fluid flow in said conduit.

17. An arrangement for measuring radioactivity of a flowing fluid in a conduit, said arrangement comprising a measuring chamber, means for circulating at least a portion of said fluid through said measuring chamber, a manometer tube coupled to said measuring chamber, a manometer fluid filling at least a portion of said manometer tube and said measuring chamber, means for displacing said manometer fluid so that the displacement is proportional to the rate of flow in said conduit, and radiation detecting means for determining the radioactivity of said fluid portion in the measuring chamber, said detecting means including a radiation detecting crystal so shaped to overlie a detecting volume of said chamber, the displacement from which is proportional to the fluid flow in said conduit.

18. An arrangement for measuring radioactivity of a flowing fluid in a conduit, said arrangement comprising a sampling means coupled to said conduit for continuously extracting a fluid sample therefrom, a reservoir for said fluid sample coupled to said sampling means by tubing, said tubing connected to the top corners of said reservoir at an angle from the vertical to improve the response time of said arrangement, means controlled by the rate of flow of said fluid for actuating said sampling means to control the amount of said fluid sample in said reservoir, and means for detecting the total amount of radioactivity in said fluid sample so that the total amount of radioactivity passing through said conduit is indicated.

References Cited by the Examiner

UNITED STATES PATENTS

| | | | |
|---|---|---|---|
| 2,714,168 | 7/55 | Hencke | 250—43.5 |
| 2,738,426 | 3/56 | Hurst | 250—83.6 |
| 2,744,199 | 5/56 | Juterbock | 250—43.5 |
| 2,823,179 | 2/58 | Snell | 250—83.6 |
| 2,961,543 | 11/60 | Hauck | 250—43.5 |

RALPH G. NILSON, *Primary Examiner.*

ARTHUR GAUSS, JAMES W. LAWRENCE,
*Examiners.*